United States Patent [19]
Hoo

[11] Patent Number: 5,611,567
[45] Date of Patent: Mar. 18, 1997

[54] NON-EXPLOSIVE LINEAR RELEASE DEVICE

[75] Inventor: Edward S. Hoo, Stanhope, N.J.

[73] Assignee: Cartridge Actuated Devices, Inc., Fairfield, N.J.

[21] Appl. No.: 572,899

[22] Filed: Dec. 18, 1995

[51] Int. Cl.$^6$ ..................................................... B60R 21/26
[52] U.S. Cl. ............................................. 280/737; 280/71
[58] Field of Search ..................................... 280/737, 741

[56] References Cited

U.S. PATENT DOCUMENTS

| | | |
|---|---|---|
| 3,647,393 | 3/1972 | Leising et al. . |
| 3,724,870 | 4/1973 | Kurokawa . |
| 3,752,500 | 8/1973 | Culver . |
| 3,784,223 | 1/1974 | Hass et al. . |
| 3,792,872 | 2/1974 | Jones . |
| 3,815,935 | 6/1974 | Jones . |
| 3,900,211 | 8/1975 | Russell et al. . |
| 3,948,540 | 4/1976 | Meacham . |
| 3,966,225 | 6/1976 | Marlow . |
| 3,966,228 | 6/1976 | Neuman . |
| 3,968,980 | 7/1976 | Hay . |
| 3,984,126 | 10/1976 | Goetz et al. . |
| 3,985,375 | 10/1976 | Lewis et al. . |
| 4,006,919 | 2/1977 | Neuman . |
| 4,018,457 | 4/1977 | Marlow . |
| 4,021,058 | 5/1977 | Suzuki et al. . |
| 4,289,327 | 9/1981 | Okada . |
| 4,332,298 | 6/1982 | Smith . |
| 4,358,998 | 11/1982 | Schneiter . |
| 4,950,458 | 8/1990 | Cunningham . |
| 4,998,751 | 3/1991 | Paxton et al. . |
| 5,009,855 | 4/1991 | Nilsson . |
| 5,022,674 | 6/1991 | Frantom et al. . |
| 5,076,607 | 12/1991 | Woods et al. . |
| 5,131,680 | 7/1992 | Coultas et al. . |
| 5,213,362 | 5/1993 | Coultas . |
| 5,226,668 | 7/1993 | Delong . |
| 5,230,531 | 7/1993 | Hamilton . |
| 5,242,194 | 8/1993 | Popek et al. . |
| 5,257,817 | 11/1993 | Cuevas . |
| 5,273,312 | 12/1993 | Coultas . |
| 5,301,979 | 4/1994 | Allard . |
| 5,335,940 | 9/1994 | Cuevas . |
| 5,345,876 | 9/1994 | Rose et al. . |
| 5,348,344 | 9/1994 | Blumenthal . |
| 5,351,988 | 10/1994 | Bishop et al. . |
| 5,356,176 | 10/1994 | Wells . |
| 5,388,322 | 2/1995 | Simon . |
| 5,388,859 | 2/1995 | Fischer et al. . |
| 5,421,609 | 6/1995 | Moore et al. . |
| 5,429,386 | 7/1995 | Mihn . |
| 5,441,302 | 8/1995 | Johnson et al. . |
| 5,458,368 | 10/1995 | Cermak ................................. 280/737 |
| 5,474,328 | 12/1995 | Nilsson ................................. 280/737 |

*Primary Examiner*—Kenneth R. Rice
*Attorney, Agent, or Firm*—Nolte, Nolte and Hunter, P.C.

[57] ABSTRACT

A non-explosive pyrotechnic linear release device is comprised of a body within which, at a proximal end, a pyrotechnic, comprised of a compressed gasless ignition powder, is contained behind a support ram which extends forward from the distal end of the body to support the sealed exit end of a pressure container which has been charged with a fluid, preferably air. The compressed pyrotechnic provides a psi pressure against the proximal end of the support ram greater than the psi pressure of the fluid against the sealed exit end of the pressure container. When the pyrotechnic is ignited by signal from an impact detecting element in the automobile during a crash, the pressure provided by the compacted pyrotechnic is dissipated, the support ram is then pushed proximally by the pressure from the pressure container and the exit end of the pressure container becomes unsealed and releases the fluid under pressure to the air bag or bags provided in the automobile.

5 Claims, 3 Drawing Sheets

NON-EXPLOSIVE LINEAR RELEASE DEVICE

FIELD OF THE INVENTION

Pyrotechnic linear release device for maintaining and releasing fluid in a container charged with the fluid under pressure, particularly for releasing compressed air to an automobile safety air bag.

BACKGROUND OF THE INVENTION

U.S. Pat. No. 4,289,327 discloses a mechanical air bag device in which a frangible lid seals a container having gas under pressure. The frangible lid is supported by a pressing lid in contact with a link mechanism. Upon impact, the link mechanism is released which, in turn, releases the pressing lid which permits the frangible lid to be fractured by the high pressure gas to inflate the bag.

U.S. Pat. No. 5,301,979 discloses a gas air bag inflator where an ignitor causes a piston to be driven forward to knock out a seal to release the gas.

U.S. Pat. No. 5,388,322 discloses an explosive driven piston that is used to drive out a seal to release gas.

U.S. Pat. No. 3,900,211 discloses a ceramic support tube which is destructed by means of a pyrotechnic charge. The ceramic element, prior to destruction, holds a poppet against the container opening. The web of the poppet which closes the container opening is fractured by the fluid pressure of the container when the ceramic element is destroyed by pyrotechnic charge and forced to the opposite end of the poppet.

These prior art devices are complicated and expensive. Some of them release toxic gases to the safety air bag.

The present invention provides a non-explosive pyrotechnic linear release device comprising a body within which, at a proximal end, a pyrotechnic comprised of a compressed gasless ignition powder is contained behind a support ram which extends forward from the distal end of the body to support the sealed exit end of a pressure container which has been charged with a fluid, preferably air. The compressed pyrotechnic provides 20,000 psi pressure, for example, against the proximal end of the support ram while the fluid under pressure provides 8,000 psi, for example, against the sealed exit end of the pressure container. When the pyrotechnic is ignited by signal from an impact detecting element in the automobile during a crash, the pressure provided by the compacted pyrotechnic is dissipated, the support ram is then pushed proximally by the pressure from the pressure container and the exit end of the pressure container becomes unsealed and releases the fluid under pressure to the air bag or bags provided in the automobile.

The structure of the invention permits the use of the heat generated by the burning of the pyrotechnic to raise the temperature of the released gas. In this respect, heat transfer fins are provided around the proximal end of the body in the area where the gasless ignition powder is contained and ignited.

The in-line structure of the invention further permits the disposition of two or more chambers containing compressed gasless ignition powder, longitudinally displaced from one another and ignitable either together or in sequence or reverse sequence to provide one, two or three speeds at which the gas is released to the air bag; controlled by initiators activated by weight/size sensors in the vehicle and/or by vehicle temperature sensors. One of the chambers houses the compressed powder at the proximal end of the device behind a primary support ram, while a second chamber houses a second charge of compressed powder within the primary support ram behind a secondary ram which extends forward to support the sealed exit end of the pressure container. Separate initiators ignite the pyrotechnic in the separate chambers.

BRIEF DESCRIPTION OF THE DRAWINGS

FIG. 2c is a plan view of the device of FIGS. 2, 2a and 2b taken along the line 2c—2c of FIG. 2a.

DETAILED DECRIPTION OF THE INVENTION

Figure 1:
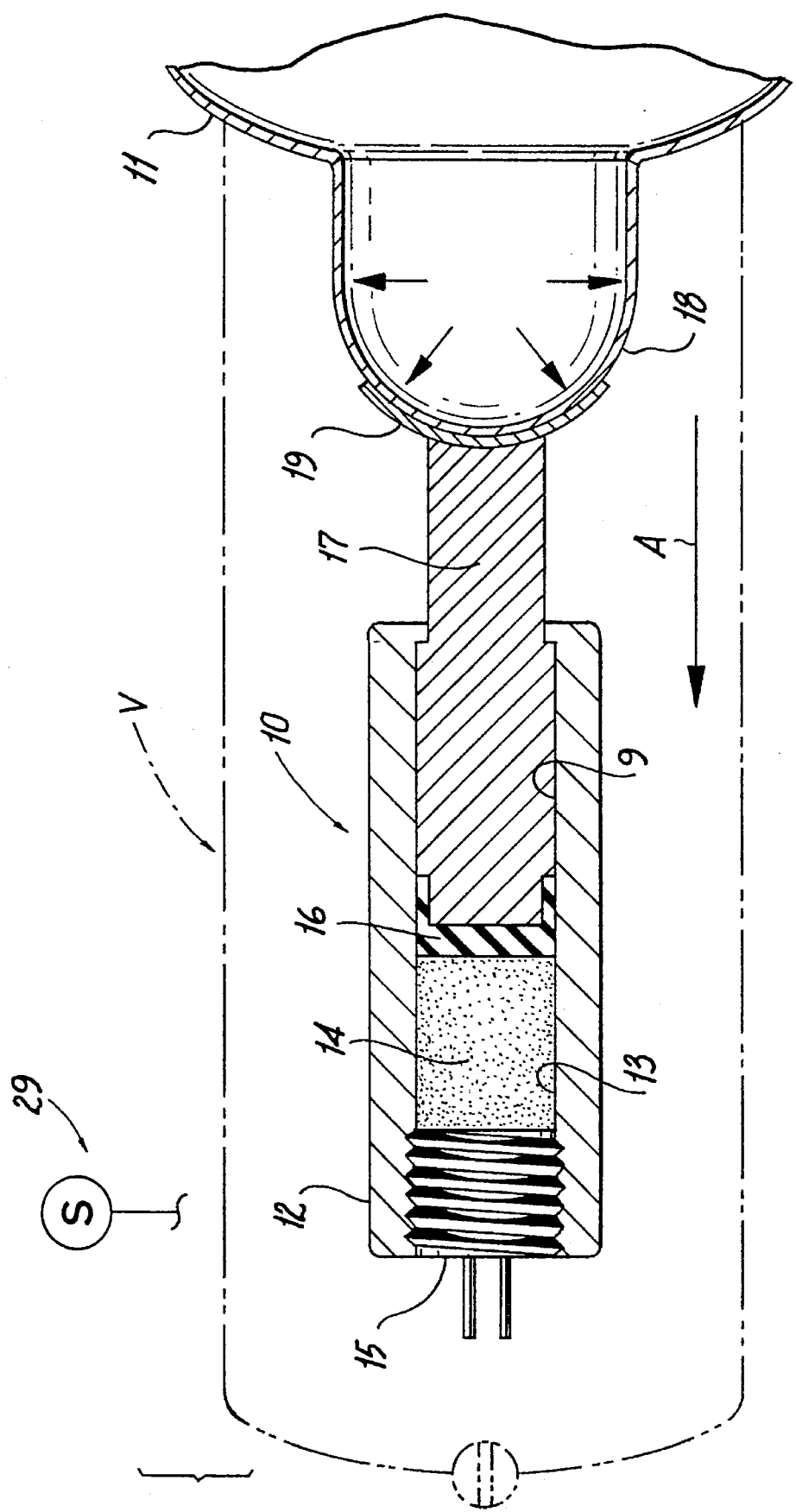
FIG. 1 is a schematic sectional view of a pyrotechnic linear release device of the invention.

The release device 10 of FIG. 1 is designed to be fitted within a valve structure V or other channeling structure which delivers gas released from a pressurized bottle 11 over the device in a path parallel to the center axis of the device, as indicated by arrow A to an automobile safety air bag, not shown, or other inflatable object. In the present instance, the preferred gas is compressed air.

The release device comprises a hollow cylindrical outer body 12 with a proximal end forming a chamber 13 within which a pyrotechnic comprised of a compressed gasless pyrotechnic powder 14 is held against an initiator 15 screwed into the proximal end of the body 12. The powder may be compressed in place or deposited in the chamber in pre-compressed "pill" form. A cup seal 16 tightly fitted and slidable in the bore 9 of the cylindrical body is seated against the compressed powder and forms the seat for the proximal end of support ram 17 as well as the seal against the escape of pyrotechnic powder when the powder is ignited and the ram 17 is forced toward the proximal end of the bore of the cylindrical body. The support ram 17 is tightly fitted and slidable in bore 13.

The distal end of the ram abuts against the frangible seal 18 to the outlet of pressurized container 11. In this instance, a pressing disc 19 shaped to conform to the shape of the frangible seal is interposed between the distal end of the ram and the frangible seal to support the seal over a large area against the pressure in the container indicated by the arrows within the container exit end in FIG. 1. In practice, the disc shape may be formed as part of the ram distal end; or the distal end of the ram may be shaped to conform to the shape of the container seal, whatever that may be.

As previously explained, the pressure offered by the compressed powder against the pressure container seal through the ram is greater than the pressure offered by the gas within the container against the seal.

The pyrotechnic powder should be of the gasless ignition type which may comprise a mixture of zirconium, ferric oxide and diatomaceous earth. Resultingly, the mixture does not explode, but rather burns upon being ignited. When ignited within chamber 23, the volume of the powder diminishes and dissipates to the volume of the products of ignition.

The heat of ignition is used in the embodiment of the invention shown in FIGS. 2, 2a, 2b and 2c by providing heat transfer fins 30 extending radially from the hollow cylindrical body 22 of the release device 20. As in the construction shown in FIG. 1, the release device 20 is designed to be fitted within a valve structure V2 (diagrammatically shown in phantom only in FIG. 2b) or other channeling structure which delivers the compressed air released from the pressurized container 21 to an automobile safety air bag, not shown, or other inflatable object. The released air is propelled in the direction of arrows Aa in FIG. 2b generally parallel to the axis of the release device 20 over and between the heat transfer fins 30.

The fins 30 are circumferentially spaced about the proximal end of the cylindrical body in the area of the chamber 23 within which is contained the compressed gasless pyrotechnic powder 24. The compressed powder is held in place between initiator 25 and the proximal end of support ram 27 tightly fitted and slidable within bore 23 of cylindrical body 22. "O"-ring seal 26 is fitted within a groove at the distal end of the ram in the conventional manner.

The distal end of the ram abuts the seal 28, shown diagrammatically in the figures, which seals pressurized container 21.

As in the device of FIG. 1, the pressure differential between the compressed powder and air within the pressurized container acts to retain the ram against the seal to keep the gas contained in the container.

As can be seen with reference to the figures, when a signal 29, generated by any means activated by auto impact, for example, triggers the initiator, the compressed pyrotechnic powder contained between the initiator and ram (FIGS. 1 and 2) is ignited (FIG. 2a) and is dissipated (FIG. 2b) as is the pressure against the support ram. Resultingly, the pressure of the compressed air in the container (indicated by the arrows) forces the seal or breaks the seal (FIG. 1) and forces the ram toward the proximal end of the body releasing the compressed air. In the device of FIGS. 2, 2a, 2b and 2c, the air is channeled passed the fins 30 heated by the ignition of the powder which heats the air as it passes over the fins.

Figure 3:
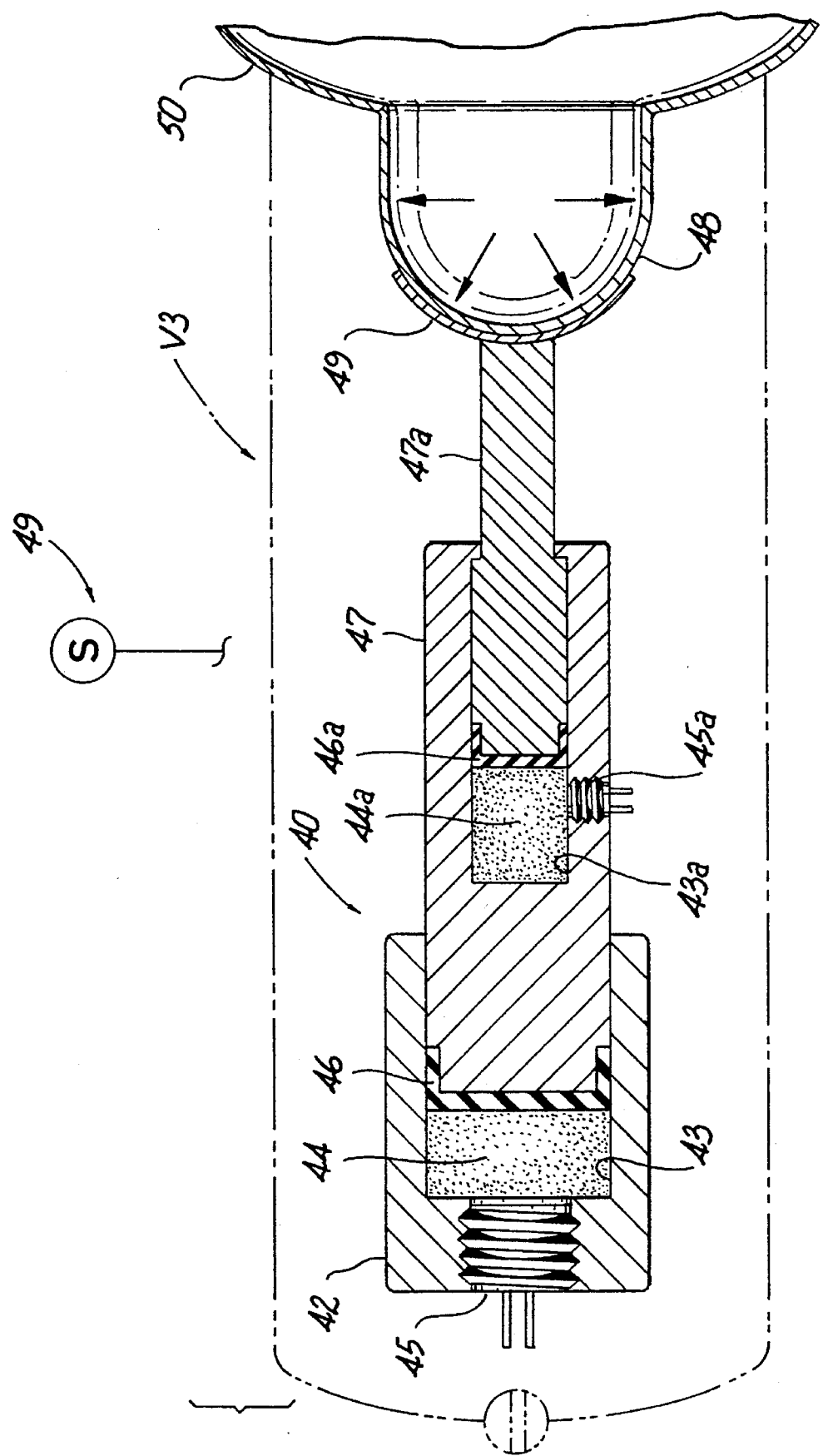
FIG. 3 is a schematic sectional view of a pyrotechnic linear release device of the invention incorporating two chambers with pyrotechnic ignition powder with respective initiators.

Referring now to FIG. 3, the release device 40 incorporates two chambers 43, 43a in which pyrotechnics 44, 44a comprised of compressed gasless ignition powder are contained by the proximal ends of inner hollow cylindrical body or primary support ram 47 and secondary support ram 47a respectively, the latter being tightly fitted and slidable in outer cylindrical body 42, the body 42, compressed powder chambers 43, 43a and rams 47, 47a all extending, in line, along the center axis of the device.

Cup seals 46, 46a provide seats for the proximal ends of the rams and seal against the escape of the pyrotechnic powder when the powder is ignited. Chamber 43 in the outer body is closed by initiator 45 screwed into the proximal end of the body while chamber 43a is closed by the end of the bore within which the secondary ram and seal are slidably fitted. Initiator 45a communicates with chamber 43a through a threaded hole in which the initiator is screwed on the side of the ram 47a.

As in the device of FIG. 1, a pressing disc 49 shaped to conform the outer surface of the frangible seal 48 of pressure container 50 is interposed between the distal end of the secondary support ram 47a and the frangible seal 48 to support the seal over a large area against the pressure in the container 50 against the frangible seal, as indicated by the arrows in FIG. 3.

Figure 2:
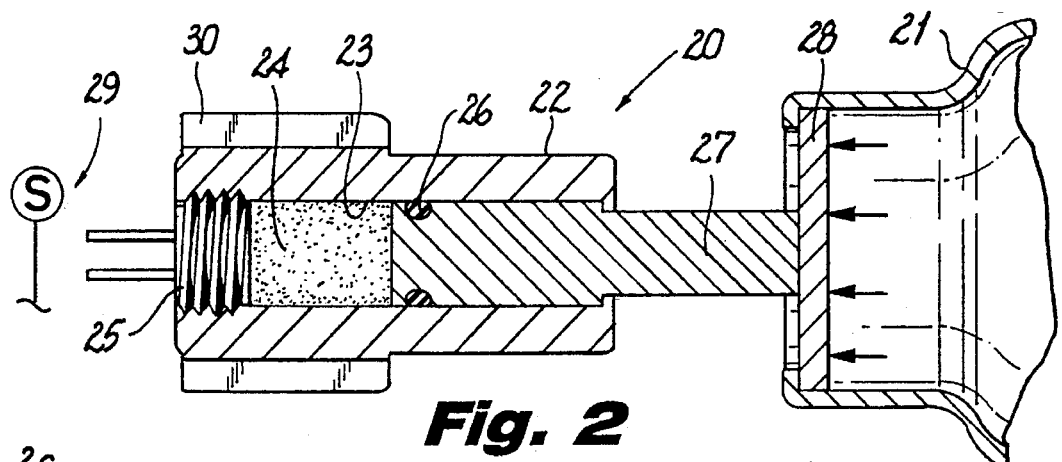
FIG. 2 is a schematic sectional view of a pyrotechnic linear release device similar to the device of claim 1, but incorporating heat transfer fins and diagrammatically showing the device before firing.
Figure 2A:
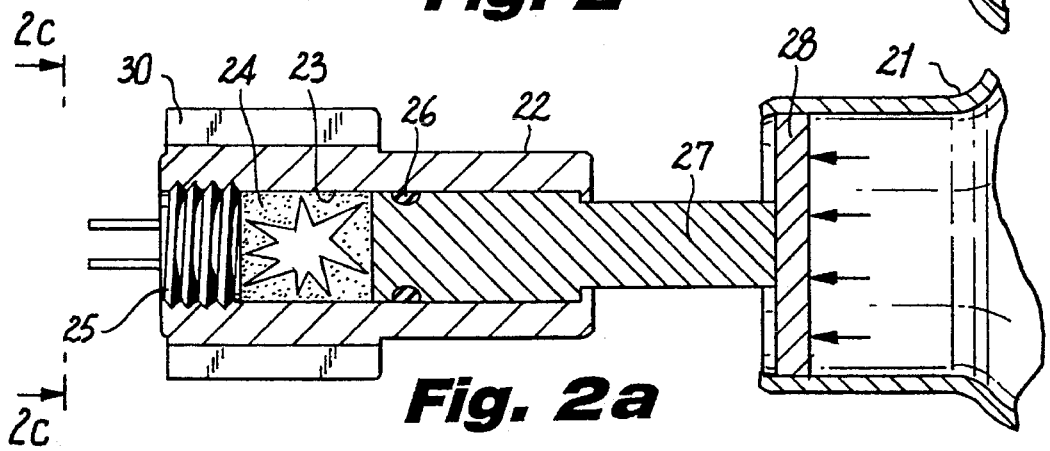
FIG. 2a is a schematic sectional view of the device of FIG. 2 diagrammatically showing the device during firing.
Figure 2B:
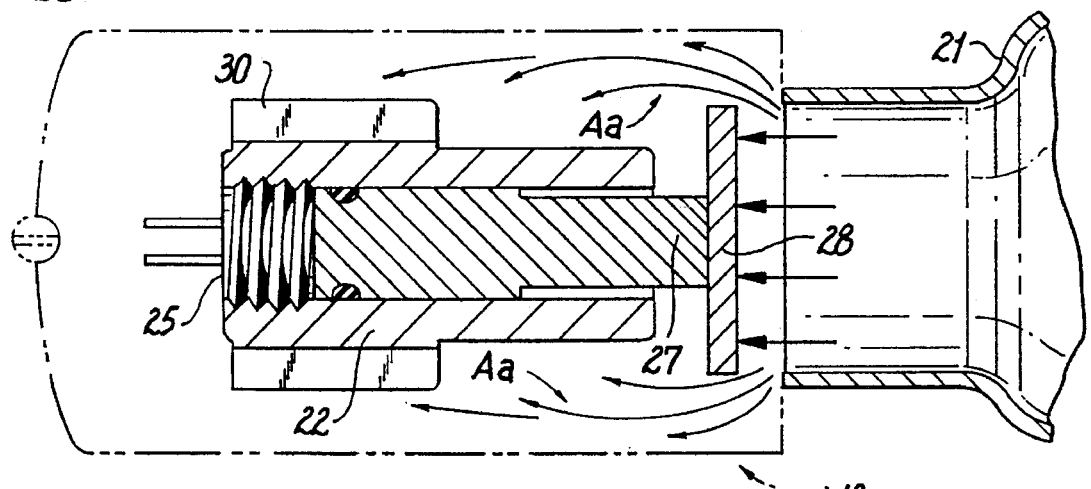
FIG. 2b is a schematic sectional view of the device of FIGS. 2 and 2a diagrammatically showing the device after firing.
Figure 2C:
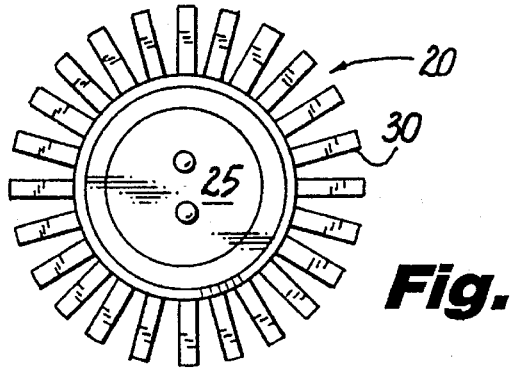

The operation of the device of FIG. 3 is basically the same as that of the devices of FIGS. 1 and 2 except that with two compressed pyrotechnics ignitable by two separate initiators the release of the compressed gas can be accomplished in three different speeds. In this respect, the signal 49 may be generated by a weight/size sensor or vehicle temperature sensor to actuate initiators 45 and 45a simultaneously to ignite both pyrotechnics 44, 44a to most quickly release the gas; or to actuate initiator 45a to ignite only pyrotechnic 44a to release the gas less quickly; or to actuate initiator 45 to ignite only pyrotechnic 44 for the slowest release of the gas. The volume and/or psi of the pyrotechnic in chambers 43 and 43a may, of course, be varied to customize the amount of time desired to release the gas.

I claim:

1. A linear non-explosive pyrotechnic device for use in combination with a pressure container for releasing gas from an exit end of the pressure container in which the gas is contained under a pressure to offer resistance of predetermined psi sufficient to open a seal enclosing the exit end of the container, said device comprising a hollow cylindrical body having a bore extending along a center axis from a proximal end of said body to a distal end of said body, a pyrotechnic contained within said bore adjacent said proximal end, said pyrotechnic comprising a powder positioned and compressed to offer linear resistance along said center axis of predetermined psi in excess of the pressure under which the gas in the container is contained, a ram extending along said center axis and abutting said pyrotechnic with a proximal end, said ram extending past said distal end of said cylindrical body to a distal end, said distal end of said ram comprising means for abutting the seal enclosing the exit end of the container and for maintaining pressure against the seal derived from the abutment of said ram against said pyrotechnic, means for igniting said pyrotechnic, said pyrotechnic comprising means for diminishing in volume when ignited, said ram being slidable in said hollow cylindrical body and comprising means for moving toward said proximal end of said cylindrical body under force of the pressure in the container when said pyrotechnic is ignited and diminished in volume, and means directing the gas from the container axially with respect to said body.

2. The device of claim 1 wherein said ram comprises a primary ram having a bore and a secondary ram slidable in said primary ram and said device further comprises a second pyrotechnic contained in said bore in said primary ram and abutting a proximal end of said secondary ram, a distal end of said secondary ram constituting said distal end of said ram comprising means abutting the seal enclosing the exit end of the container.

3. The device of claim 2, further comprising separate means for igniting said second pyrotechnic.

4. The device of claim 1 in combination with means for directing gas released from the container over and axially relative to said device.

5. The device of claim 4, including heat transfer means for heating the gas released from the container as it passes over said device.

* * * * *